(12) United States Patent
Takahashi et al.

(10) Patent No.: US 7,966,691 B2
(45) Date of Patent: Jun. 28, 2011

(54) DUST COLLECTOR

(75) Inventors: Kumio Takahashi, Ibaraki (JP);
Masahiro Inaniwa, Ibaraki (JP);
Yoshimasa Hayama, Ibaraki (JP);
Daisuke Kakegawa, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 158 days.

(21) Appl. No.: 12/160,494

(22) PCT Filed: Jan. 19, 2007

(86) PCT No.: PCT/JP2007/051219
§ 371 (c)(1),
(2), (4) Date: Jul. 10, 2008

(87) PCT Pub. No.: WO2007/083844
PCT Pub. Date: Jul. 26, 2007

(65) Prior Publication Data
US 2010/0154161 A1 Jun. 24, 2010

(30) Foreign Application Priority Data

Jan. 20, 2006 (JP) ................................ P2006-013241

(51) Int. Cl.
*A47L 7/00* (2006.01)
(52) U.S. Cl. .......................................... 15/339; 15/352
(58) Field of Classification Search .................... 15/339, 15/347, 352; 55/283, DIG. 3, DIG. 34
See application file for complete search history.

(56) References Cited

U.S. PATENT DOCUMENTS

| 7,296,323 | B2 * | 11/2007 | Hayama et al. | 15/339 |
| 7,309,365 | B2 * | 12/2007 | Yuasa et al. | 55/283 |
| 7,871,463 | B2 * | 1/2011 | Hayama et al. | 96/425 |
| 2005/0065662 | A1 | 3/2005 | Reindle et al. | |

FOREIGN PATENT DOCUMENTS

| DE | 19530542 | 8/1995 |
| DE | 29814547 | 8/1998 |
| JP | 60-031725 | 2/1985 |
| JP | 60-212140 | 10/1985 |
| JP | 1-115329 | 5/1989 |
| JP | 4-075622 | 3/1992 |
| JP | 08-103618 | 4/1996 |

(Continued)

OTHER PUBLICATIONS

Japanese Office Action, with English translation, issued in Japanese Patent Application No. 2006-013241, mailed Sep. 7, 2010.

(Continued)

*Primary Examiner* — Dung Van Nguyen
(74) *Attorney, Agent, or Firm* — McDermott Will & Emery LLP (57) ABSTRACT

To provide a dust collector which, even when it is used in a poor power supply situation, can detect the dust loading of a filter accurately, can remove dust automatically and can reduce power consumption. In the dust collector, there is provided a control circuit which can detect the dust loading of a filter by comparing the threshold value of the dust loading pressure to be determined by the internal pressure of the filter, the operation of a suction device, the power supply frequency of the suction device and the supply voltage of the suction device with the filter internal pressure just before the suction device stops, and, when the filter is dust loaded, can operate a dust removing device.

2 Claims, 6 Drawing Sheets

FOREIGN PATENT DOCUMENTS

| | | |
|---|---|---|
| JP | 9-000843 | 1/1997 |
| JP | 2002-337102 | 11/2002 |
| JP | 2005-058641 | 3/2005 |
| JP | 2005-205325 | 8/2005 |
| WO | WO 2005/058117 A1 | 6/2005 |

OTHER PUBLICATIONS

Taiwanese Notification of Examination Observations, w/ English translation thereof, issued in Taiwanese Patent Application No. 096102247 dated Nov. 24, 2009.

* cited by examiner

| THRESHOLD VALUES (kPa) / VOLTAGE (V) | 50Hz STRONG OPERATION | 50Hz WEAK OPERATION | 60Hz STRONG OPERATION | 60Hz WEAK OPERATION |
|---|---|---|---|---|
| ~ 72.5 | 10.08 | 5.75 | 9.91 | 4.91 |
| 72.5 ~ 77.5 | 11.09 | 6.66 | 10.94 | 5.77 |
| 77.5 ~ 82.5 | 12.03 | 7.46 | 11.88 | 6.61 |
| 82.5 ~ 87.5 | 12.96 | 8.27 | 12.83 | 7.45 |
| 87.5 ~ 92.5 | 13.90 | 9.07 | 13.78 | 8.29 |
| 92.5 ~ 97.5 | 14.84 | 9.88 | 14.72 | 9.13 |
| 97.5 ~ 102.5 | 15.77 | 10.68 | 15.67 | 9.97 |
| 102.5 ~ 107.5 | 16.85 | 11.53 | 16.59 | 10.76 |
| 107.5 ~ 112.5 | 17.92 | 12.38 | 17.51 | 11.54 |
| 112.5 ~ | 18.99 | 13.27 | 18.43 | 12.33 |

FIG. 10

| THRESHOLD VALUES (kPa) / VOLTAGE (V) | 50Hz STRONG OPERATION | 50Hz WEAK OPERATION | 60Hz STRONG OPERATION | 60Hz WEAK OPERATION |
|---|---|---|---|---|
| ~ 72.5 | 12.62 | 7.34 | 12.43 | 6.37 |
| 72.5 ~ 77.5 | 13.87 | 8.41 | 13.73 | 7.39 |
| 77.5 ~ 82.5 | 15.00 | 9.40 | 14.85 | 8.42 |
| 82.5 ~ 87.5 | 16.12 | 10.38 | 15.96 | 9.45 |
| 87.5 ~ 92.5 | 17.25 | 11.37 | 17.07 | 10.49 |
| 92.5 ~ 97.5 | 18.37 | 12.35 | 18.18 | 11.52 |
| 97.5 ~ 102.5 | 19.50 | 13.34 | 19.30 | 12.55 |
| 102.5 ~ 107.5 | 20.77 | 14.39 | 20.45 | 13.52 |
| 107.5 ~ 112.5 | 22.05 | 15.45 | 21.61 | 14.48 |
| 112.5 ~ | 23.33 | 16.51 | 22.76 | 15.45 |

DUST COLLECTOR

TECHNICAL FIELD

The present invention relates to a dust collector which collects the cut dust and ground dust of a power tool for cutting timber such as a circular saw and a jigsaw and a power tool used to make a hole in concrete or in stone or to cut or grind the concrete or stone such as a hammer drill and a stone cutter from a hose connected to a dust collecting mechanism set up as an annex to such power tools, and cleans cut dust and ground dust in a workshop.

BACKGROUND ART

Description will be given below of a conventional dust collector with reference to FIGS. 7 and 8.

Figure 7:
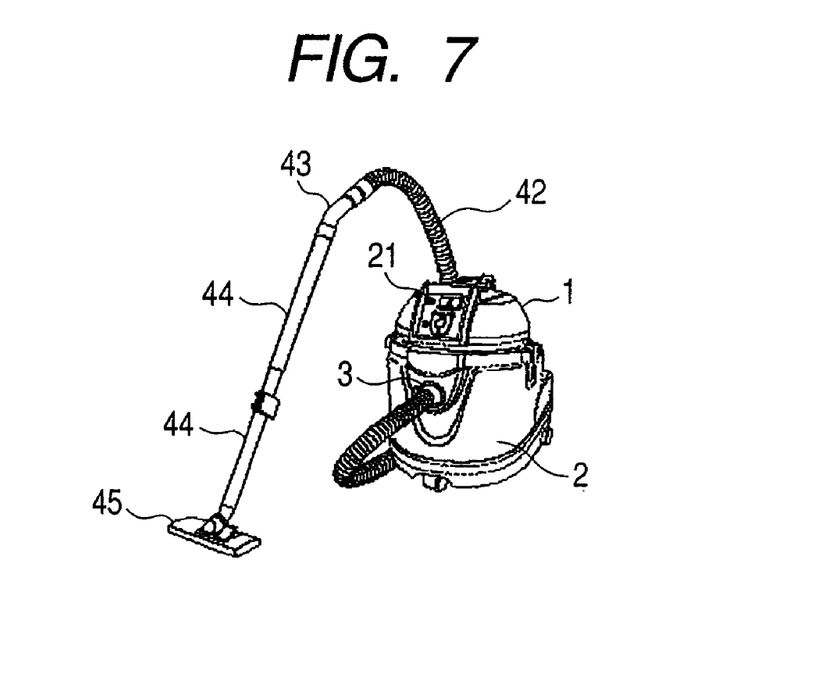
FIG. 7 is a view of conventional dust collector which is used to clean the floor.

FIG. 7 shows a conventional dust collector which is used to clean the floor and the like of a workshop where a power tool for cutting timber such as a circular saw and a jigsaw and a power tool used to make a hole in concrete or in stone or to cut or grind the concrete or stone such as a hammer drill and a stone cutter are used. In FIG. 7, to the suction opening 3 of the dust collector 1, there are connected a hose 42, a hose connecting handle 43, two extension pipes 44, a floor suction opening 45 and the like; and, normally, an operator carries out a cleaning operation while holding the hose connecting handle 43.

Dust on the floor is sucked in together with the ambient air from the floor suction opening 45, is then carried through the two extension pipes 44, hose connecting handle 43 and hose 42, and is further sucked into the dust collector 1 from the suction opening 3.

The dust collector 1 shown in FIG. 7 is driven by operating a switch provided on an operation panel 21 and, while holding the hose connecting handle 43, the operator allows the dust collector 1 to suck and collect dust existing on the floor or the like of the workshop. The operator often operates the dust collector 1 in the neighborhood of the dust collector 1 and thus, as the hose 42, there is often used a thick and short hose which has a diameter of about 38 mm and a length of about 2.5 m.

Figure 8:
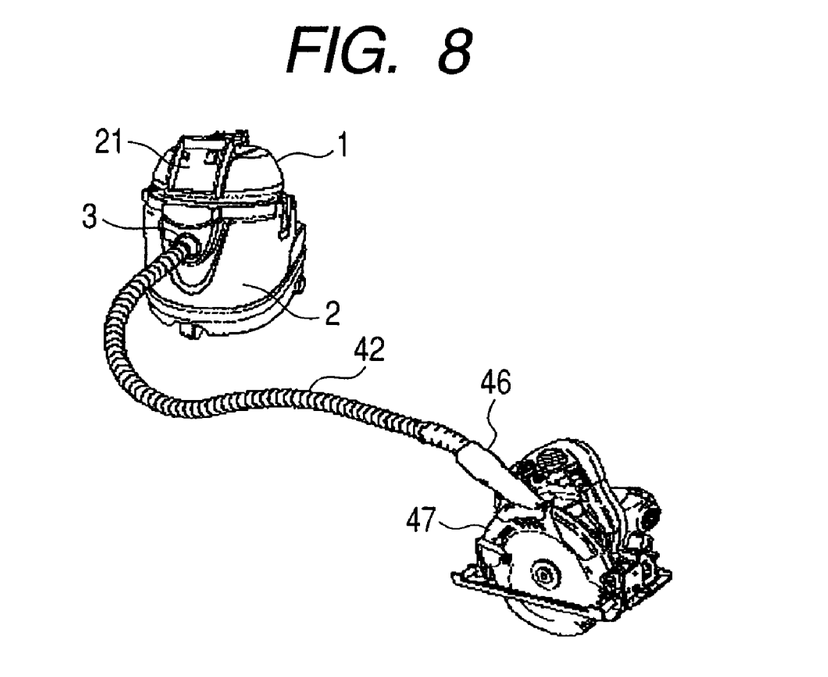
FIG. 8 is a view of a conventional dust collector to be used while it is mounted on the dust collecting mechanism of a power tool.

FIG. 8 shows a conventional dust collector which sucks and collects directly the cut dust of a power tool for cutting timber such as a circular saw and a jigsaw and a power tool used to make a hole in concrete or in stone or to cut or grind the concrete or stone such as a hammer drill and a stone cutter.

In this dust collector 1, a hose 42 is connected to the suction opening 3 of the dust collector 1, the leading end of the hose 42 is connected through a power tool exclusive suction opening 46 to the dust collecting mechanism of a power tool 47, and the cut dust of the power tool 47 is sucked from the power tool exclusive suction opening 46 through the hose 42 into the dust collector 1.

When using the dust collector 1, an operator often operates the power tool 47 while standing away from the dust collector 1 and, as the hose 42, there is often used a thin and long hose which has a diameter of about 25 mm and a length of about 3 m or longer. The reason for this is that, when the hose 42 is thick and short, the operation of the power tool can be disrupted. Also, there is known a dust collector which has the following link operation mode or function: that is, when a plug socket is provided on the operation panel 21 or the like of the dust collector and the power tool 47 is operated using the power supply from the socket, the dust collector is automatically set in its operation state; and, when the power tool 47 is caused to stop, automatically, the dust collector 1 is left in the operation state for several seconds before it is caused to stop. And, the dust collector 1 having the link operation mode often has a further function to switch the dust collector 1 between the operation state and stop state using an operation switch to thereby carry out the same operation as the dust collector shown in FIG. 7. In this case, an operation mode to run the dust collector 1 while switching the dust collector 1 between the operation state and stop state using the operation switch is called a simple operation mode. That is, the simple operation mode is distinguished from the above-mentioned link operation mode.

The dust collectors 1 respectively shown FIGS. 7 and 8 mainly collect cut dust produced when the timber, stone, concrete, plasterboard and the like are cut. Such cut dust often includes fine dust and thus a filter to divide the air containing the dust into the dust and clean air is easily loaded up with such fine dust. In view of this, conventionally, a dust collector including a dust removing mechanism for removing dust stuck to the filter is used in a workshop for cutting timber, stone, concrete, plasterboard and the like.

Such dust collector includes a dust collector having on its dust collector exterior portion an operation arm for operating a dust removing mechanism, in which the operation arm is operated by an operator each time a filter is loaded with fine dust and thus the dust is removed manually (for example, see JP-9-000843).

Also, there is known a dust collector in which the internal pressure of a filter is converted to an electric signal, this electric signal is compared with a preset threshold signal, and a dust removing device is automatically operated for a time during which the above-converted electric signal is larger than the preset threshhold (for example, see JP-60-212140).

DISCLOSURE OF INVENTION

In the above-mentioned conventional dust collector disclosed in the patent reference 1 in which dust is removed manually, each time the filter is loaded with dust, an operator must operate the operation arm to remove the dust manually, which is troublesome for the operator. Also, such dust collector often excludes means for the operator to recognize the dust loading of the filter. Therefore, the operator must judge the loading of the filter from personal experience, or the operator knows the loading of the filter only after the sucking power of the dust collector is lowered. In this case, the dust removing operation is carried out even after the loading state of the filter is worsened. That is, the dust collector is sometimes used in a state where the dust collecting ability of the dust collector cannot be fulfilled fully.

Also, in the dust collector disclosed in the patent reference 2, in which the dust removing device is automatically operated, when two or more electric products such as a dust collector and other electric products are operated simultaneously using the power supply of the same wiring, even if the performance of the suction device of the dust collector is lowered and the filter is loaded with dust due to the voltage drop involved with the operation of the suction device of the dust collector and due to the voltage drop involved with the operation of the electric product used together with the dust collector, the loading of the filter cannot be detected because the internal pressure of the filter is not lowered. That is, in some cases, the filter is used while it is left loaded with dust.

The invention aims at eliminating the above-mentioned defects found in the conventional dust collectors. Thus, it is an object of the invention to provide a dust collector which, even when it is used under the poor power supply circumstances, can detect the loading of the filter with high precision, can remove the dust of the filter automatically, and can prevent the dust collecting performance thereof from worsening.

In attaining the above object, according to the invention, there is provided a dust collector, comprising: a tank including a suction opening for storing dust therein; a suction device for sucking in dust; a filter device for catching dust; and, a dust removing device for removing dust stuck to the filter device, characterized by: pressure detect means for detecting the internal pressure of the filter device; suction device operation detect means for detecting the operation of the suction device; frequency detect means for detecting the power supply frequency of the suction device; supply voltage detect means for detecting the supply voltage of the suction device; means for comparing the signal of the pressure detect means just before stop of the suction device with a preset dust loading pressure threshold value determined by the suction device operation detect device just before stop of the suction device, the frequency detect means and the supply voltage detect means; and, a control circuit, when the suction device operation detect means detects the stop of the suction device, for driving the comparing means to compare the signal of the pressure detect means just before stop of the suction device with the dust loading pressure threshold value so as to detect the dust loading of the filter and, when the filter is detected to be in the dust loaded state, for driving the dust removing device.

According to the invention as set forth in claim 1, there can be provided a dust collector which can detect the dust loading of the filter with high precision even under a deteriorated power supply situation and can remove the dust automatically, thereby preventing its dust collecting capability from lowering.

According to a dust collector as set forth in claim 2, since the dust removing device is allowed to stop automatically after it operates for a given time, wasteful consumption of power can be prevented.

BEST MODE FOR CARRYING OUT THE INVENTION

Description will be given below of an embodiment of a dust collector according to the invention with reference to FIGS. 1 to 6, 9 and 10.

Figure 1:
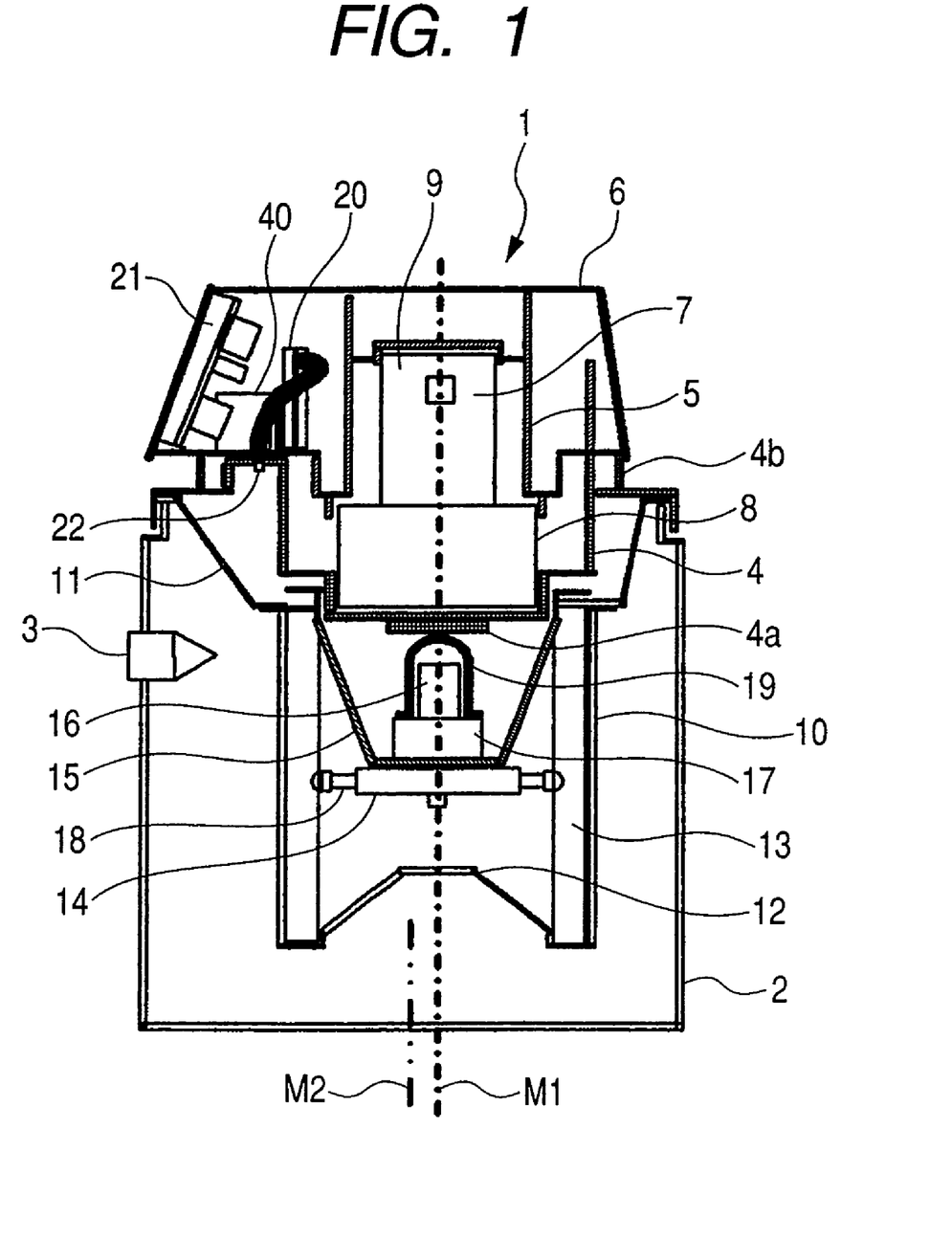
FIG. 1 is a transverse section view of an embodiment of a dust collector according to the invention.
Figure 2:
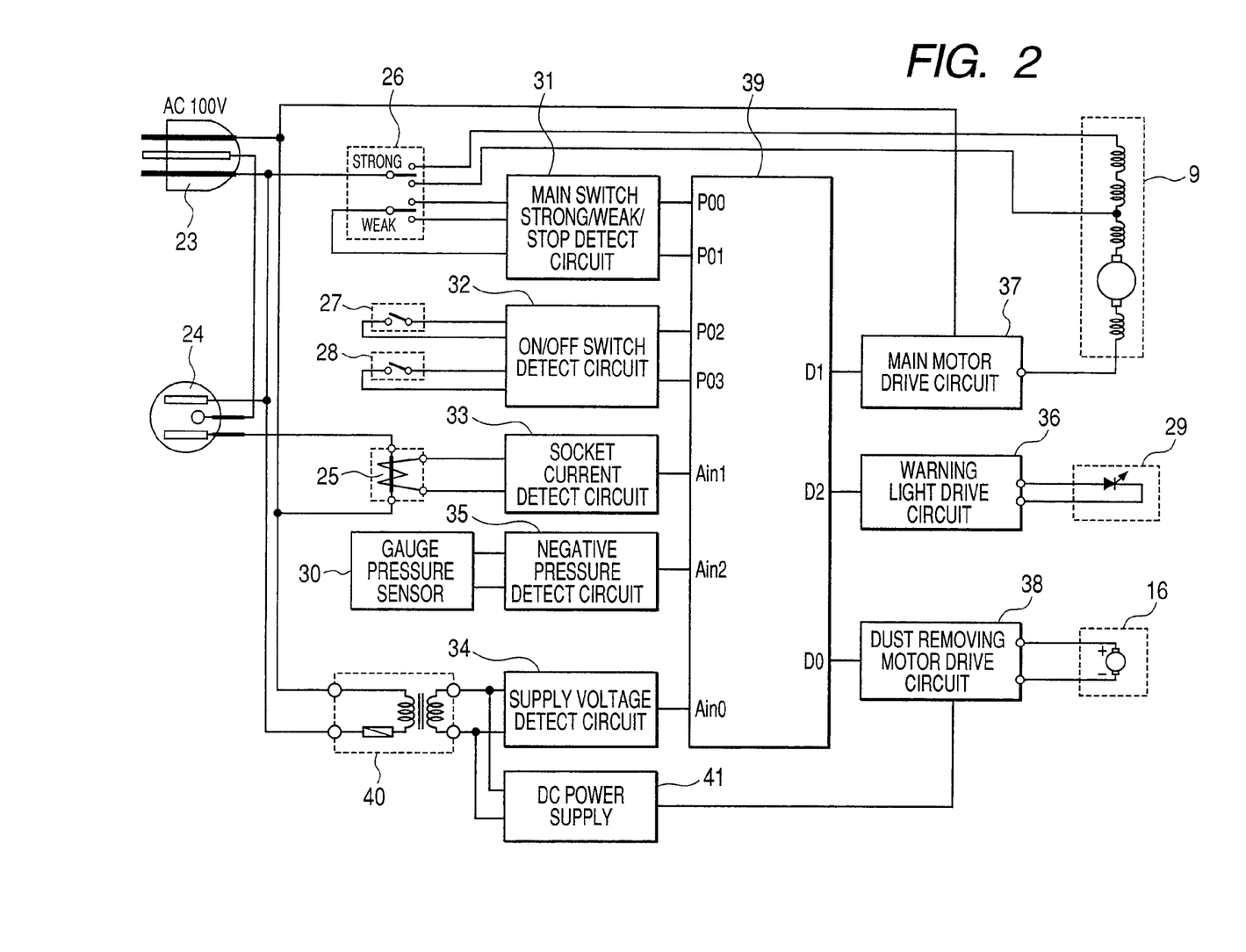
FIG. 2 is a block diagram of the function of a control unit used in the dust collector according to the invention.
Figure 3:
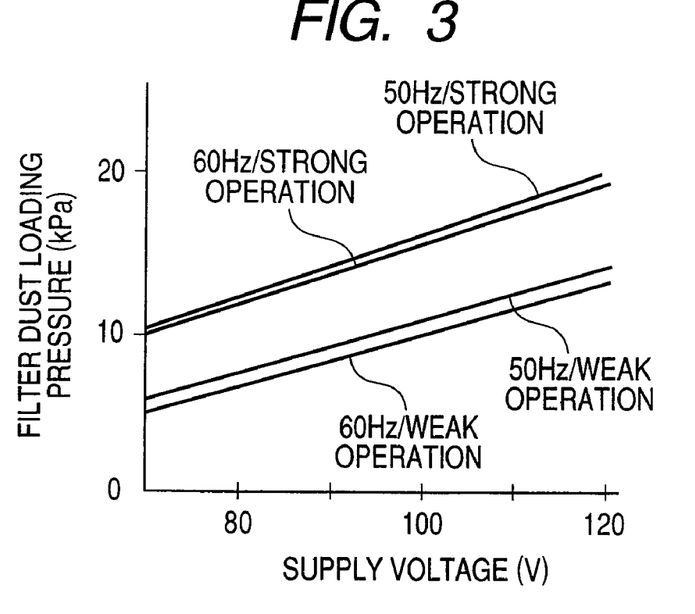
FIG. 3 is a graphical representation of an example for showing the measured results of the filter dust loading pressures of the dust collector according to the invention.
Figure 4:
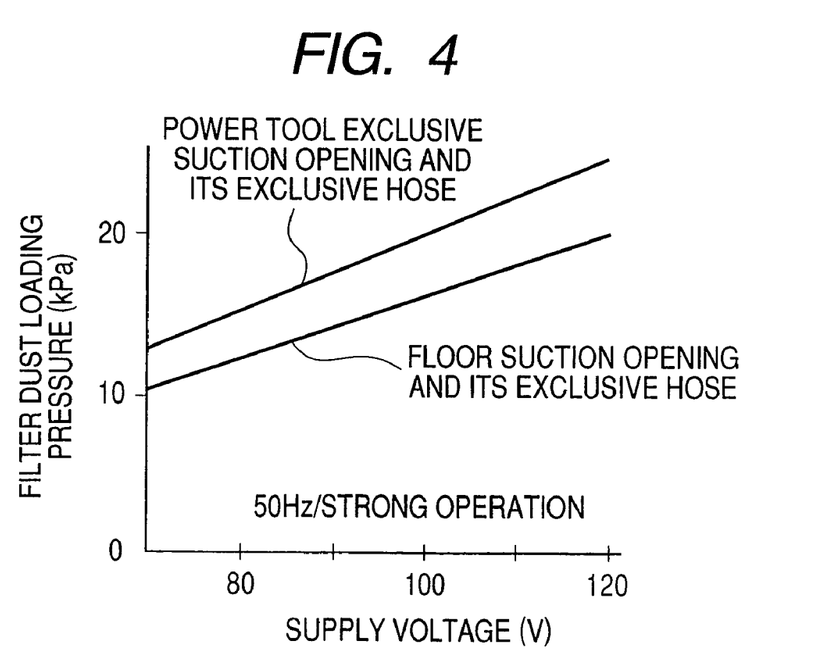
FIG. 4 is a graphical representation of an example for showing the measured results of the filter dust loading pressures of the dust collector according to the invention.
Figure 5:
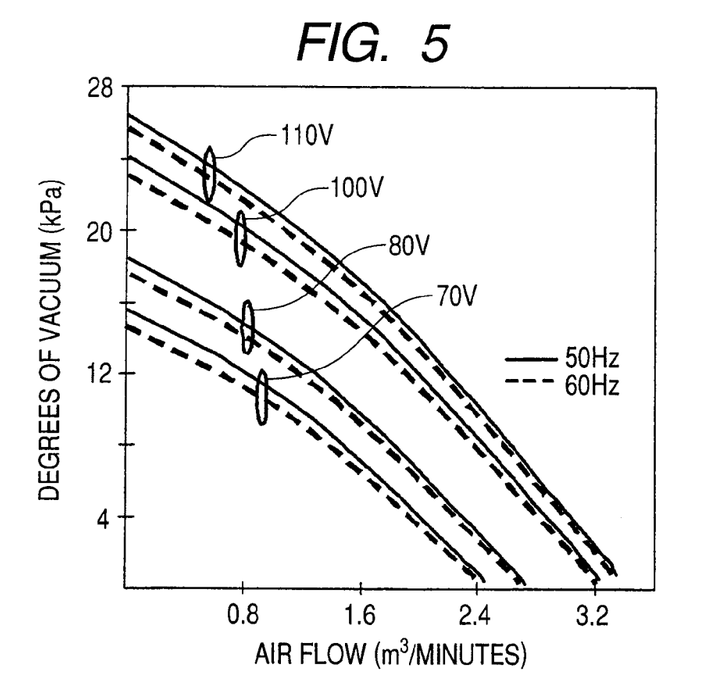
FIG. 5 is a graphical representation of an example for showing the measured results of the air flow and the degrees of vacuum of the dust collector according to the invention.
Figure 6:
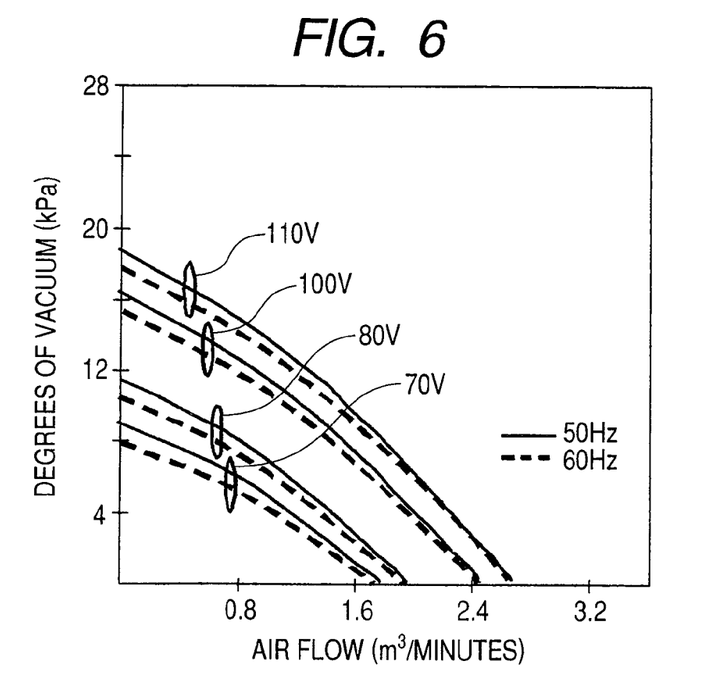
FIG. 6 is a view of a conventional dust collector including a floor suction opening.
Figure 9:
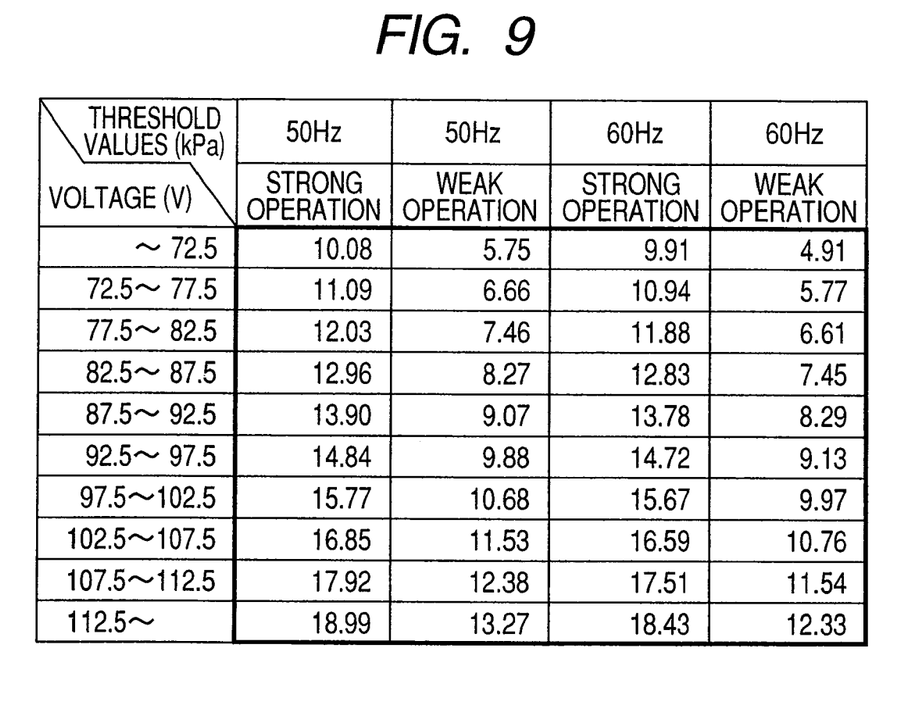
FIG. 9 is a table for an example in which filter dust loading threshold values are set according to the invention.
Figure 10:
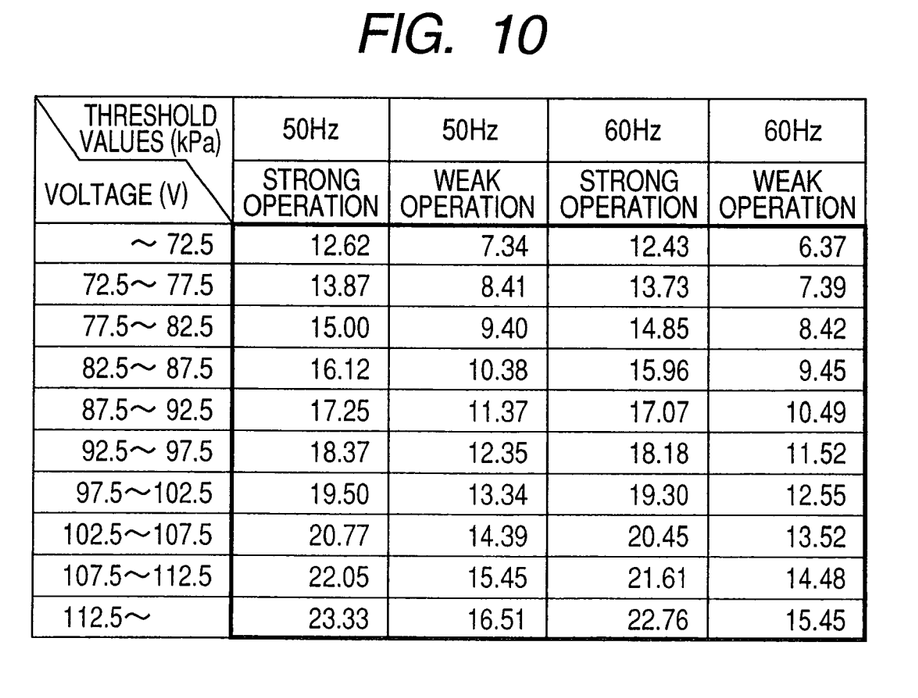
FIG. 10 is a table for an example in which filter dust loading threshold values are set according to the invention.

FIG. 1 is a side section view of a dust collector according to the invention, showing the structure thereof. FIG. 2 is a block diagram of the function of a control unit employed in the present dust collector. FIGS. 3 and 4 are graphical representations of the examples of measured loading pressures according to the dust collector of the invention. FIGS. 5 and 6 are graphical representations of examples of measured air flow and the degrees of vacuum according to the dust collector of the invention. FIGS. 9 and 10 respectively show the examples of preset filter loading threshold values according to the dust collector of the invention. In the following description, the upward direction shown in FIG. 1 expresses the upper side of the present dust collector, whereas the downward direction shown in FIG. 1 expresses the lower side thereof.

As shown in FIG. 1, to the upper opening portion of a cylindrical-shaped tank 2, which includes a suction opening 3 and is used to store dust therein, there are clamped a main motor base 4 with a main motor cover 5 mounted thereon and a head cover 6 by a hold member (not shown). Between the main motor base 4 and main motor cover 5, there is interposed a suction device 7. The suction device 7 includes a suction fan 8 and a main motor 9 for rotating the suction fan 8. The suction device 7 sucks therein the open air (air), which has been sucked in from the suction opening 3 (which will be discussed later), through a filter 13 and a suction opening 4a formed in the lower portion of the main motor base 4, and exhausts the thus-sucked open air (air) from an exhaust opening 4b to the outside of the dust collector 1 through an exhaust path composed of the main motor base 4, main motor cover 5 and head cover 6.

On the other hand, between the upper opening portion of the tank 2 and main motor base 4, there is held and fixed a filter housing 11. On the filter housing 11, there are mounted a filter 13 for catching dust and a filter cover 12 for preventing the filter 13 from being crushed by the negative pressure of the interior of the filter 13 caused by the operation of the suction device 7, while the filter housing 11, filter cover 12 and filter 13 cooperate together in constituting a filter device 10.

In a portion enclosed by the filter housing 11 and filter 13, there is provided a dust removing device 14 according to the invention. The dust removing device 14, which is mounted on a dust removing device base 15, comprises a dust removing motor 16 for driving the dust removing device 14, a dust preventive cover 19 for preventing dust from entering the dust removing motor 16, a reduction gear 17 coupled to the output shaft (not shown) of the dust removing motor 16, and a dust removing member 18 which is disposed on the output shaft of the reduction gear 17 and, when it is driven by the dust removing motor 16, strikes (vibrates) dust stuck to the filter 13 to thereby remove the dust.

The vertical-direction center M1 of the suction device 7, filter 13, filter cover 12 and dust removing device 14 exists substantially on the same line and is shifted from the center line M2 of the tank 2 in the opposite direction to the forming position of the suction opening 3. In the portion of the main motor cover 5 that exists upwardly of the suction opening 3, there are disposed an operation panel 21, a control circuit 20, an insulating transformer 40 and the like. On the portion that is exists in the vicinity of the installation position of the control circuit 20, is situated upwardly of the suction opening 3 of the main motor cover 5 and is distant from a main flow passage of the air introduced by the suction device 7, there is mounted a pressure measuring terminal 22. The pressure measuring terminal 22 is connected to a gauge pressure sensor 30, which is disposed within the control circuit 20, by a hose or by pipe arrangement. Thus, the gauge pressure sensor 30 functions as a sensor which detects the state of the internal pressure of the filter device 10 as a difference between the internal pressure of the filter device 10 and the atmospheric pressure. And, since the control circuit 20 and pressure measuring terminal 22 are disposed adjacent to each other, not only they can be connected together by a short hose or by short pipe arrangement but also the gauge pressure sensor 30 and a negative pressure detect circuit 35 (which will be discussed later) can be mounted together with the control circuit 20.

To the suction opening 3, similarly to the conventional dust collectors respectively shown in FIGS. 7 and 8, there is connected a hose 42 or an extension pipe 44; and, on the leading end portion of the hose 42 or extension pipe 44, there is mounted a power tool 47 with a dust collecting mechanism or a floor suction opening 45, thereby providing a structure which can suck in the cut dust of the plasterboard or ordinary dust together with the air.

Next, description will be given below of the control unit of the dust collector according to the invention with reference to FIG. 2. A power plug 23 is connected to a commercial power supply (for example, an alternating current 100V); and, power is supplied to a socket 24 which supplies power, through one of the contacts of a strong/weak/stop switching switch 26 functioning as a main switch of the dust collector 1, to the main motor 9, a main motor drive circuit 37 for controlling the operation of the main motor 9, the primary side of the insulating transformer 40, and other external equipment such as the power tool 47. To the secondary side of the insulating transformer 40, there are connected a supply voltage detect circuit 34 and a DC power supply 41. Not only the dust removing motor 16 and a dust removing motor drive circuit 38 for driving the dust removing motor 16, to which the power is supplied from the DC power supply 41, but also the control circuit 20 are electrically insulated from the external power supply. Although not shown, the power control element of the main motor drive circuit 37 is electrically insulated by a light insulating coupler called a photo-triac or a photo-coupler. Also, since the dust removing motor 16 is electrically insulated by the secondary side output of the insulating transformer 40 and the insulating transformer 40 is mounted at a position existing upwardly of a discharge passage for use when water is sucked into the dust collector, even when the dust removing motor 16 is covered with water, it is possible to prevent a user from touching the supply voltage and thus from being struck by an electric shock.

To detect the operation state of the power tool 47 connected to the socket 24, there is provided the following detect means: that is, there is provided the socket 24 for supplying the power to the power tool 47 which is arranged to operate in a link operation manner, the current of the socket 24 is detected by a current detector 25, the thus detected current is converted by a socket current detect circuit 33 into a voltage which can be recognized by a microcomputer 39, the thus converted voltage is input to the analog signal input port Ain1 of the microcomputer 39, and, through the operation of the microcomputer 39, the operation state of the power tool 47 connected to the socket 24 is detected. As the power tool 47 to be connected to the socket 24, recently, there has been often used a power tool which is enhanced in function and thus mounts a DC power supply device thereon to cope with the enhanced function. For this reason, the means for detecting the operation state of the power tool 47 preferably may have a function to recognize the currents in such a manner that the distorted current to be input to the direct current power supply device is distinguished from the current of a series commutator motor functioning as the drive source of the power tool 47, instead of the peak value or mean value of the waveform of the current which is detected by the current detector 25.

Also, according to the present embodiment, to detect the operation state of the suction device 7, there is provided the following detect means: that is, the contact information of the strong/weak/stop switching switch 26 is converted by a main switch strong/weak/stop detect circuit 31 into a digital voltage which can be recognized by the microcomputer 39, the digital voltage is input to the digital signal input ports P0O and P01 of the microcomputer 39 and, through the operation of the microcomputer 39, the operating state of the suction device 7 is detected. Also, although not shown, a signal to be applied to a common contact is converted to a signal the voltage of which, after the full-wave rectification of a power circuit and before the smoothing processing thereof, is clamped to 5V by a clamp circuit to thereby provide a square wave in which the voltage turns from 5V to 0V at an interval where the waveform of the supply voltage zero crosses, and the interval for providing the 0V is operated by the microcomputer 39 to thereby detect the power supply frequency.

The suction device 7, even when the power supply of the main motor 9 is turned off, will not stop immediately due to its inertia. For this reason, in the operation of the microcomputer 39, there is executed a processing in which, at the time when a preset time, during which the suction device 7 is operating due to the inertia, has passed from the time when the power supply to the main motor 9 is turned off, it is detected that the operation state of the suction device 7 is switched to the stop state. This processing applies similarly to a case where an off signal is output to the digital output port D1 of the microcomputer 39 to stop the main motor 9. The time, during which the suction device 7 is operating due to the inertia, is of the order of 10 seconds.

The link operation/simple operation switching switch 17 is a switch which includes means for detecting the operation state of the power tool 47 connected to the socket 24 and is used to select one of two operation modes, namely, a link operation mode and a simple operation mode. Specifically, in the link operation mode, when the power tool 47 connected to the socket 24 is turned into its operation state, the suction device 7 is turned into its operation state and, when the power tool 47 is turned from the operation state to the stop state, after the suction device 7 is allowed to continue to operate for several seconds, the suction device 7 is caused to stop; and, in the simple operation mode, according to the states of the operation switch, the suction device 7 is simply operated or stopped. Generally, when a common electrode and a normally-open electrode are both off, the link operation mode is selected, whereas, for the on state of the two electrodes, the simple operation mode is selected. When carrying out a dust collecting operation using the floor suction opening 45 or the like while the power tool 47 is not yet connected to the socket 24, the link operation/simple operation switching switch 27 is turned on to thereby operate the dust collector in the simple operation mode. In the link operation mode, as described above, when the power tool 47 is switched from the operation state to the stop state, after the suction device 7 is allowed to operate for several seconds, the suction device 7 is caused to stop. The reason for this is as follows: that is, when the power tool 47 with a dust collecting mechanism is used in combination with the present dust collector, as described above, there is often used a long hose easy to be loaded with dust and, therefore, it is necessary to prevent the long hose from being loaded with dust.

A dust removing motor on switch 28 is an operation switch which is used to operate the dust removing device 14. When a user presses down this switch, the dust removing device 14 is put into its operation state for several seconds to thereby remove dust from the filter 13. However, the dust removing motor on switch 28 is valid only when the processing function of the microcomputer 39 detects that the operation state of the suction device 7 is switched over to its stop state. In a state where it is not detected that the operating state of the suction device 7 is switched over to its stop state, even when the user depresses the switch 28, such switch depressing operation is ignored and thus the dust removing device 14 is not operated. The reason for this is as follows: that is, even if a dust removing operation is executed, while the suction device 7 is in operation and while it is allowed to rotate due to the inertia, dust stuck to the filter cannot be removed due to the negative pressure, and thus, by stopping the operation of the dust removing device during the operation state of the suction device 7, the waste of the power and the damage of the filter due to the ineffective operation of the dust removing device can be avoided.

A warning light 29 is a display light which is turned on when the processing function of the microcomputer 39 detects the loaded state of the filter 13.

A negative pressure detect circuit 35 is means which, on receiving the signal of the gauge pressure sensor 30 for detecting the state of the internal pressure of the filter device 10 as a difference between the atmospheric pressure and the internal pressure thereof, converts the signal into a voltage recognizable by the microcomputer 39 in the form of a voltage signal in which the pressure difference is proportional to the voltage, and inputs the converted voltage signal to the analog signal input port Ain2 of the microcomputer 39, thereby converting the state of the internal pressure of the filter device 10 to an electric signal which can be compared with a preset threshold value of the loading pressure and can be calculated according to such comparison.

The main motor 9 includes two sets of field windings and thus can be switched over to a strong operation state, a weak operation state and a stop operation by operating the strong/weak/stop switching switch 26. The operation state and stop state of the main motor 9 can also be switched over to each other through the main motor drive circuit 37 by the digital output signal D1 of the microcomputer 39. Further, when, as the power control element of the main motor drive circuit 37, for example, a two-way phase control element (a triac) is used and the phase of the main motor 9 is controlled by the element, the air suction ability of the suction device 7 can also be changed. In the description of the present embodiment, description will be given below of a case in which the main motor 9 is used in the three, namely, strong, weak and stop operation states.

As regards the dust removing motor 16, the operation and stop states thereof are switched over to each other through the dust removing motor drive circuit 38 according to the digital output signal D0 of the microcomputer 39. Also, by allowing the power control element to execute a chopping operation, the dust removing motor 16 can also be operated or started softly; and, the soft-start operation can also employ a method for preventing the voltage of the DC power supply from being lowered due to the starting current of the dust removing motor 16.

The supply voltage detect circuit 34 constitutes means which converts the secondary voltage of the insulating transformer 40 to the voltage that can be recognized by the microcomputer 39, inputs the converted voltage into the analog signal input port Ain0 of the microcomputer 39, and detects the supply voltage through the operation of the microcomputer 39.

The dust collector 1 having the above-mentioned structure and function, as described above, includes two operation modes, that is, a simple operation mode and a link operation mode.

The simple operation mode is an operation mode in which, when the link operation/simple operation switching switch 27 is set to the simple operation side and the strong/weak/stop switching switch 26 is set to the strong or weak side, the main motor 9 of the suction device 7 is set in the operation state; and, either when the link operation/simple operation switching switch 27 is set to the link operation side or when the strong/weak/stop switching switch 26 is set to the stop side, the main motor 9 is turned off.

The link operation mode is an operation mode in which, in a state where the link operation/simple operation switching switch 27 is set to the link operation side and the strong/weak/stop switching switch 26 is set to the strong or weak side, when the power tool 47 is connected to the socket 24 and it is detected that the power tool 47 is switched to the operation state, the main motor 9 of the suction device 7 is turned to the operation state. To detect the operation state of the power tool 47, when a current flows in the socket 24 of the dust collector 1, the current of the socket 24 may be detected by the current detector 25, the detected current is converted by the socket current detect circuit 34 into the voltage that can be recognized by the microcomputer 39, the voltage may be input to the analog signal input port Ain1 of the microcomputer 39, and, through the operation of the microcomputer 39, it may be detected that the power tool 47 connected to the socket 24 is in the operation state. And, the microcomputer 39 outputs an on signal to the digital output signal D1 and thus the main motor drive circuit 37 drives the main motor 9 into the operation state. When the power tool 47 connected to the socket 24 is turned off and no current flows in the socket 24, the input of the analog signal input port Ain1 of the microcomputer 39 becomes zero, whereby it can be detected that the power tool 47 is in the stop state. In this case, after the main motor 9 is left in the operation state for several seconds, an off signal is outputted to the digital output signal D1 of the microcomputer 39 and thus the main motor 9 is turned off by the main motor drive circuit 37. While the dust collector 1 is operating in the link operation mode, when the link operation/simple operation switching switch 27 is put to the simple operation side, the link operation mode is removed and thus the dust collector 1 is switched over to a state where the dust collector is operating in the above-mentioned simple operation mode; and, therefore, when the strong/weak/stop switching switch 26 is put to the stop side, the main motor 9 is turned off immediately regardless of the operation state of the power tool 47.

The filter loaded state of the dust collector 1 having the above-mentioned structure and function can be assumed by checking how much the air flow, that is, the amount of the air passing through the filter 13 during the operation of the suction device 7 is lowered from a state where no dust sticks to the filter 13. However, since the internal pressure of the filter 13 is strongly correlated with the air flow, in the dust collector according to the invention, there is employed a method which uses the value of the internal pressure of the filter 13 to check the loaded state of the filter 13.

Also, as the main motor 9 of the suction device 7 of a relatively small-sized dust collector such as the dust collector 1 according to the invention, as described above, there is often used a series commutator motor; and, such suction device 7 varies greatly in the characteristic thereof according to the operation states thereof, power supply frequencies and supply voltages. In FIG. 3, there is shown an example of the relationship between the air flow and the degree of vacuum measured when the suction device 7 is operated in a strong operation mode as well as the power supply frequency and supply voltage are varied. And, in FIG. 4, there is shown an example of the relationship between the air flow and the degree of vacuum measured when the suction device 7 is operated in a weak operation mode as well as the power supply frequency and supply voltage are varied. The air flow and the degree of vacuum are measured outside the suction opening. The input power when the suction device 7 is operated at 100V/50 Hz is substantially 1200 W in the strong operation mode, and 600 W in the weak operation mode. It can be understood from FIGS. 3 and 4 that, when the power supply frequency is 50 Hz and 60 Hz, curves for expressing the relationship between the air flow and the degree of vacuum are different from each other.

Also, it can also be understood that the curves for expressing the relationship between the air flow and the degree of vacuum measured when the supply voltage is varied like 70V, 80V, 100V, 110 V are different according to the supply voltages. Further, when the relationships between the air flow and the degree of vacuum when the power supply frequency and voltage in FIGS. 3 and 4 are the same are compared with each other, it can be understood that they differ greatly according to the strong operation mode or weak operation mode.

FIG. 3 shows an example in which, in four kinds of operation modes, that is, when 50 Hz and 60 Hz are used as the power supply frequencies and the main motors 9 of the respective suction devices 7 are used in the strong operation mode and in the weak operation mode, while varying the supply voltage, the internal pressures of the filter 13 when the filter 13 is loaded are measured. FIG. 5 shows the results that are obtained by measuring the filter internal pressures while the state in which the measured air flow of the filter 13 is reduced 30% from the state of the filter 13 with no dust stuck thereto is regarded as the loaded state of the filter 13. As shown in FIG. 5, the loading pressure varies according to the power supply frequencies, the operation modes of the main motor 9 of the suction device 7 and supply voltages. Therefore, preferably, there may be set the loading thresholds in the respective states. Especially, since variations in the loading pressure with respect to variations in the supply voltage is large, it is necessary to set the fine threshold values.

FIG. 4 shows an example in which, in a state where the power supply frequency is set for 50 Hz and the main motor 9 of the suction device 7 is operated in a strong operation mode, when the power tool exclusive suction opening 46 and its exclusive hose 42 are mounted in front of the suction opening 3, and when the floor suction opening 45 and its exclusive hose are mounted in front of the suction opening 3, by varying the supply voltage, the internal pressures of the filter 13 when the filter 13 is loaded are measured. The judgment of the filter loading when the power tool exclusive suction opening 46 and its exclusive hose 42 are mounted is based on the results obtained by measuring the filter internal pressure while the state of the filter 13, in which the air flow measured at the position of the suction opening 3 is reduced 70% from the state of the filter 13 with no dust stuck thereto and with the hose not yet mounted on the suction opening 3, is regarded as the filter loaded state. The judgment of the filter loading when the floor suction opening 45 and its exclusive hose are mounted is made similarly to the case shown in FIG. 3 in which the air flow is reduced by 30%. As shown in FIG. 6, the loading pressure when the power tool suction opening 46 and its exclusive hose 42 are mounted differs from the loading pressure when the floor suction opening 45 and its exclusive hose are mounted. Therefore, preferably, when the dust collector is operated in the simple operation mode with the floor suction opening 45 mounted thereon and when the dust collector 1 is operated in the link operation mode with the power tool suction opening 46 mounted thereon, there may be set their respective loading pressure thresholds.

FIGS. 9 and 10 respectively show the examples of the threshold values of the loading pressures that are to be previously set and are employed in the dust collector according to the invention. Specifically, FIG. 9 shows the examples of the loading pressure threshold values to be previously set when a conventional dust collector shown in FIG. 7 having the same structure as a dust collector for cleaning a floor or the like is operated in the above-mentioned simple operation mode. And, FIG. 10 shows the examples of the loading pressure threshold values to be previously set when a conventional dust collector shown in FIG. 8 having the same structure as a dust collector for directly sucking and collecting the cut dust of a power tool is operated in the above-mentioned link operation mode.

For example, description will be given below of the operation in which the dust collector 1 according to the invention is operated with the power supply frequency of 60 Hz in a simple operation mode and in a weak operation manner and the supply voltage is lowered down to 96 V. On detecting from the state of the link operation/simple operation switching switch 27 that the dust collector 1 is operating in the simple operation mode, the processing of the microcomputer 39, when the suction device 7 is in its operation state, detects the suction device operation state and power supply frequency by means for detecting the operation state of the suction device 7 based on the contact information of the strong/weak/stop switching switch 26 and by the power supply frequency detect means, and detects the supply voltage by the supply voltage detect circuit 34. And, there is carried out the following processing: that is, according to the link operation/simple operation switching switch 26, the threshold value of the dust loading pressure is selected from the threshold values set forth in FIG. 9; according to the detect results of the suction device operation state and power supply frequency, four rows (60 Hz, weak operation) are selected from the rows shown in FIG. 9; according to the fact that the voltage detected by the supply voltage detect means is 98 V, 9.13 kPa set forth in the fourth row (60 Hz, weak operation) and in the sixth line (92.5~97.5 V) is selected as the preset threshold value of the dust loading pressure and the selected preset dust loading pressure threshold value is compared with the voltage detected by the filter internal pressure detect means; when the voltage detected by the filter internal pressure detect means is larger than 9.13 Kpa selected as the preset dust loading pressure threshold value, it is judged that the above-mentioned filter dust loading is detected. The processing, which judges that the above-mentioned filter dust loading when the suction device 7 is in the operation state is detected, is to turn on the warning light 29; and, the processing when the above-mentioned filter dust loading is not detected is to turn off the warning light 29. When the suction device 7 stops, the processing of the microcomputer 39 is to store the filter dust loading detect state at the time when the suction device 7 is just before its operation state; and, when it is detected that the operation state of the suction device 7 is switched over to the stop state, if the filter dust loading state is a state where the filter dust loading is detected, after the dust removing motor 16 is operated for several seconds, the warning light 29 is turned off. For a state where the filter dust loading is not detected, the dust removing motor 16 is not operated but the processing is ended.

Also, for example, when the dust collector 1 according to the invention is used in the link operation mode, in the strong operation, with the power supply frequency of 50 Hz and with the supply voltage of 105 V, the processing of the microcomputer 39 is: to select the threshold value of the filter dust loading pressure from the threshold values set forth in FIG. 10 composed of the threshold values in the link operation mode according to the state of the link operation/simple operation switching switch 27; to select the first row (50 Hz, strong operation) from the rows shown in FIG. 10 according to the detect results of the suction device operation state and power supply frequency; and, to select 20.77 kPa set forth in the first row (50 Hz, strong operation) and in the eighth line (102.5~107.5 V) as the preset threshold value of the dust loading pressure, thereby allow the dust collector 1 to operate similarly to the case where it operates in the above-mentioned simple operation mode.

When the main motor 9 is controlled in phase in such a manner that a set of field windings are used and, as the power control element of the main motor drive circuit 37, for example, a two-way phase control element (triac) is used, the suction ability of the suction device 7 can also be changed. Even in this case, the operation state of the suction device 7 can be detected accurately and a filter dust loading threshold value suitable for this can be set.

Also, as the drive source of the dust removing device 14, a vibrator capable of oscillatory motion may also be used instead of the motor, the motion of the dust removing member may be oscillatory motion instead of rotational motion, or there may be used a dust removing device structured so as to vibrate a filter simply.

The invention claimed is:

1. A dust collector, comprising:
a tank including a suction opening for storing dust therein;
a suction device for sucking in dust; a filter device for catching dust; and,
a dust removing device for removing dust stuck to the filter device:
pressure detect means for detecting the internal pressure of the filter device;
suction device operation detect means for detecting the operation of the suction device;
frequency detect means for detecting the power supply frequency of the suction device;
supply voltage detect means for detecting the supply voltage of the suction device;
means for comparing the signal of the pressure detect means just before stop of the suction device with a preset dust loading pressure threshold value determined by the suction device operation detect device just before the suction device, the frequency detect means and the supply voltage detect means are stopped; and,
a control circuit, when the suction device operation detect means detects the stop of the suction device, for driving the comparing means to compare the signal of the pressure detect means just before stop of the suction device with the dust loading pressure threshold value so as to detect the dust loading of the filter and, when the filter is detected to be in the dust loaded state, for driving the dust removing device.

2. A dust collector as set forth in claim 1, wherein the dust removing means is allowed to stop after it operates for a given time.

* * * * *